(12) United States Patent
Yang

(10) Patent No.: US 9,581,065 B2
(45) Date of Patent: Feb. 28, 2017

(54) WELDING STRUCTURE OF WARM-UP CATALYTIC CONVERTER

(71) Applicants: HYUNDAI MOTOR COMPANY, Seoul (KR); Kia Motors Corporation, Seoul (KR)

(72) Inventor: Dae-Sung Yang, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/874,056

(22) Filed: Oct. 2, 2015

(65) Prior Publication Data

US 2016/0115853 A1 Apr. 28, 2016

(30) Foreign Application Priority Data

Oct. 28, 2014 (KR) ........................ 10-2014-0147454

(51) Int. Cl.
*F01N 1/00* (2006.01)
*F01N 3/10* (2006.01)
*F01N 13/18* (2010.01)

(52) U.S. Cl.
CPC .......... *F01N 3/106* (2013.01); *F01N 13/1811* (2013.01); *F01N 13/1872* (2013.01); *F01N 3/101* (2013.01); *F01N 3/103* (2013.01); *F01N 13/1805* (2013.01); *F01N 2260/10* (2013.01); *F01N 2450/22* (2013.01)

(58) Field of Classification Search
USPC ......... 60/272, 280, 299, 305, 323, 324, 598, 60/602, 605.2
See application file for complete search history.

(56) References Cited

U.S. PATENT DOCUMENTS

| 5,209,062 A * | 5/1993 | Vollenweider ..... B01D 53/9431 422/177 |
| 8,341,952 B2 * | 1/2013 | Diez ..................... F01N 13/10 60/323 |
| 8,418,459 B2 * | 4/2013 | Finkbeiner ............. F01D 9/023 60/321 |
| 8,656,709 B2 * | 2/2014 | Phillips, Jr. ........... F01N 13/102 60/313 |
| 9,151,208 B2 * | 10/2015 | Schumnig ............... F01N 13/10 |
| 2010/0038901 A1 * | 2/2010 | Schmidt ................ F01N 13/102 285/294.1 |

(Continued)

FOREIGN PATENT DOCUMENTS

| JP | 2001-041030 A | 2/2001 |
| KR | 1999-005664 U | 2/1999 |

(Continued)

*Primary Examiner* — Binh Q Tran
(74) *Attorney, Agent, or Firm* — McDermott Will & Emery LLP

(57) ABSTRACT

A welding structure for a warm-up catalytic converter (WCC) of a vehicle includes a flange of a turbine housing connected to a front cone of the WCC which reduces an exhaust gas emitted from an engine. A through hole is formed in the flange, through which the exhaust gas flows. An extending portion, which extends in a direction in which the exhaust gas flows from the through hole, is formed and surface-contacts the front cone. The front cone is welded to the extending portion to connect the flange to the front cone.

7 Claims, 10 Drawing Sheets

(56) References Cited

U.S. PATENT DOCUMENTS

2012/0023928 A1* 2/2012 Smatloch ............... F01D 9/026
                                                        60/598

FOREIGN PATENT DOCUMENTS

| KR | 1999-0026486 U | 7/1999 |
| KR | 10-2002-0020002 A | 3/2002 |
| KR | 10-2002-0095583 A | 12/2002 |
| KR | 10-2006-0094568 A | 8/2006 |
| KR | 10-2010-0029900 A | 3/2010 |
| KR | 10-2014-0028347 A | 3/2014 |

* cited by examiner

-- Related Art --

-- Related Art --

-- Related Art --

-- Related Art --

WELDING STRUCTURE OF WARM-UP CATALYTIC CONVERTER

CROSS-REFERENCE TO RELATED APPLICATIONS

This application claims the benefit of priority to Korean Patent Application No. 10-2014-0147454, filed on Oct. 28, 2014, which is incorporated herein by reference in its entirety.

TECHNICAL FIELD

The present disclosure relates to a welding structure of a warm-up catalytic converter (WCC), and more particularly, to a welding structure of a WCC in which a front cone of the WCC is welded to a flange of a turbine housing.

BACKGROUND

A warm-up catalytic converter (WCC)of a vehicle purifies exhaust gas emitted from a vehicle engine has an inlet portion welded to a turbine housing.

As illustrated in FIGS. 1 and 3, a flange 101 of a turbine housing is welded to inlet portions of front cones 102 and 102' of a WCC, such that exhaust gas emitted from a turbine of the turbocharger enters the WCC.

A method for welding the front cones 102 and 102' to the flange 101 can be divided into an inner peripheral welding method as illustrated in FIGS. 1 and 2 and an outer peripheral welding method as illustrated in FIGS. 3 and 4.

The inner peripheral welding method fixes the front cone 102 to the flange 101 by inserting the inlet portion of the front cone 102 into a through hole formed in the flange 101 and then welding the front cone 102 to the flange 101 within the through hole. The inner peripheral welding method is made when an interval G1 between the flange 101 and an outer peripheral surface of the front cone 102 is narrow, and thus, a welding tool may not enter into the interval therebetween. As a result, the exhaust system can be minimized A catalyst may be activated in the early stage by improving dynamic stiffness, improvement in noise, vibration, and harshness (NVH), and shortening an exhaust passage due to the small size of the exhaust system. However, as a welded portion 103 is directly exposed to a high-temperature exhaust gas, contraction and expansion stress may apply to the flange 101, thus decreasing durability against thermal fatigue.

In the outer peripheral welding method, the inlet portion of the front cone 102' is inserted into the through hole of the flange 101 and then welding is applied at which an outer peripheral surface of the front cone 102' meets the flange 101. The outer peripheral welding method can reduce an exposure temperature and disperse the contraction and expansion stress due to the welded portion 103 formed at outside the exhaust passage, but may reduce a catalyst capacity and may deteriorate the dynamic stiffness and the NVH due to an increase in sizes of the exhaust passage and the front cone 102'.

SUMMARY

An aspect of the present inventive concept provides a welding structure for a WCC of a vehicle capable of dispersing a stress concentration of a welded portion and increasing durability against thermal fatigue by welding a front cone of the catalytic converter to a flange of a turbine housing in a state in which the flange surface-contacts the welded portion of the front cone.

Another aspect of the present inventive concept provides a welding structure for a WCC of a vehicle capable of improving weldabiltiy by making a thickness of a welded portion of a front cone in an inner circumference of the front cone thinner than a thickness of a main body of a flange.

Still another aspect of the present inventive concept provides a welding structure for a WCC of a vehicle capable of minimizing an exposure to a high-temperature exhaust gas due to a welded portion of a front cone formed in back of a portion extending from the flange.

Other objects and advantages of the present disclosure can be understood by the following description, and become apparent with reference to the embodiments of the present inventive concept. In addition, it is obvious to those skilled in the art to which the present invention pertains that the objects and advantages of the present invention can be realized by the means as claimed and combinations thereof.

In accordance with an embodiment of the present inventive concept, a welding structure for a warm-up catalytic converter (WCC) of a vehicle includes a flange of a turbine housing connected to a front cone of the WCC which reduces an exhaust gas emitted from an engine. A through hole is formed in the flange, through which the exhaust gas flows. An extending portion, which extends in a direction in which the exhaust gas flows from the through hole, is formed and surface-contacts the front cone. The front cone is welded to the extending portion to connect the flange to the front cone.

The extending portion may include an inner peripheral extending portion which extends from the through hole and contacts an inner peripheral surface of the front cone. The inner peripheral extending portion may be welded to the front cone.

An end of the inner peripheral extending portion may be welded to the inner peripheral surface of the front cone.

An end of an outer peripheral surface of the front cone may be welded to the flange.

A thickness of the inner peripheral extending part may be thinner than that of the flange.

The extending portion may further include an outer peripheral extending portion which extends from the through hole and contacts an outer peripheral surface of the front cone. The outer peripheral extending portion may be welded to the front cone.

An end of the outer peripheral extending portion may be welded to the outer peripheral surface of the front cone.

A thickness of the outer peripheral extending part may be formed to be thinner than that of the flange.

The front cone may be formed of a stainless steel material.

BRIEF DESCRIPTION OF THE DRAWINGS

FIGS. 6 and 7 are enlarged views of portion C of FIG. 5, in which FIG. 6 is a cross-sectional view illustrating a flow direction of exhaust gas and FIG. 7 is a cross-sectional view of a stress distribution.

FIGS. 9 and 10 are enlarged views of portion D of FIG. 8, in which FIG. 9 is a cross-sectional view illustrating a flow direction of exhaust gas and FIG. 10 is a cross-sectional view of a stress distribution.

DESCRIPTION OF SPECIFIC EMBODIMENTS

Hereinafter, a welding structure for a WCC of a vehicle in accordance with exemplary embodiments of the present inventive concept will be described in detail with reference to the accompanying drawings.

Figure 1:
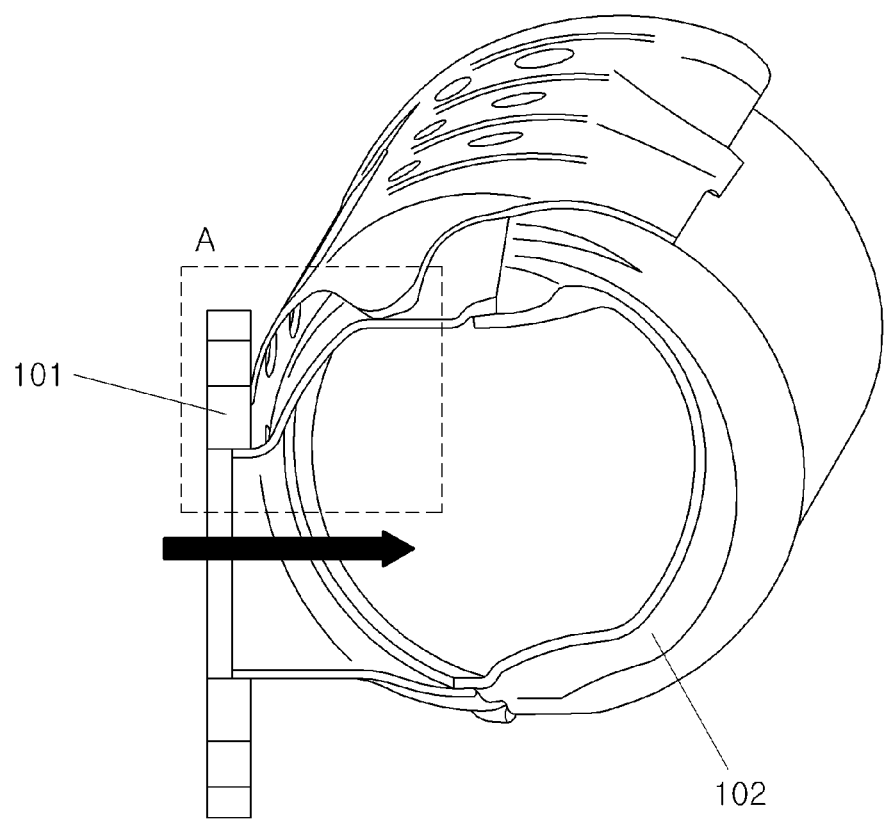
FIG. 1 is a perspective view of a WCC in which a flange of a turbine housing and a front cone of the WCC are welded to each other by an inner peripheral welding method according to a related art.
Figure 2:
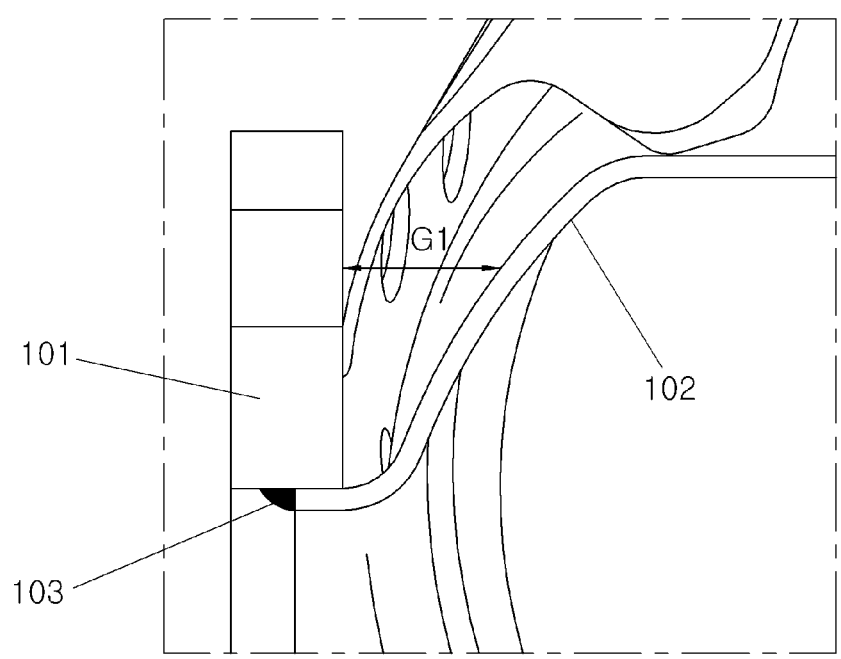
FIG. 2 is an enlarged view of portion A of FIG. 1.
Figure 3:
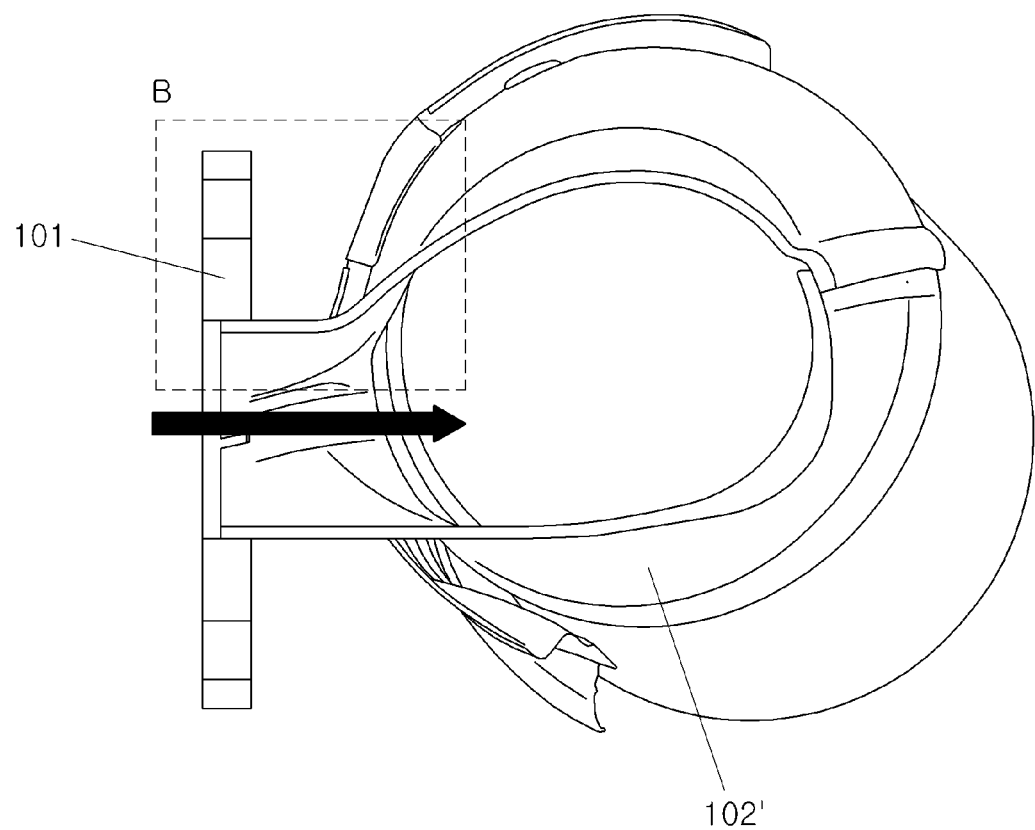
FIG. 3 is a perspective view of a WCC in which a flange of a turbine housing and a front cone of the WCC are welded to each other by an outer peripheral welding method according to a related art.
Figure 4:
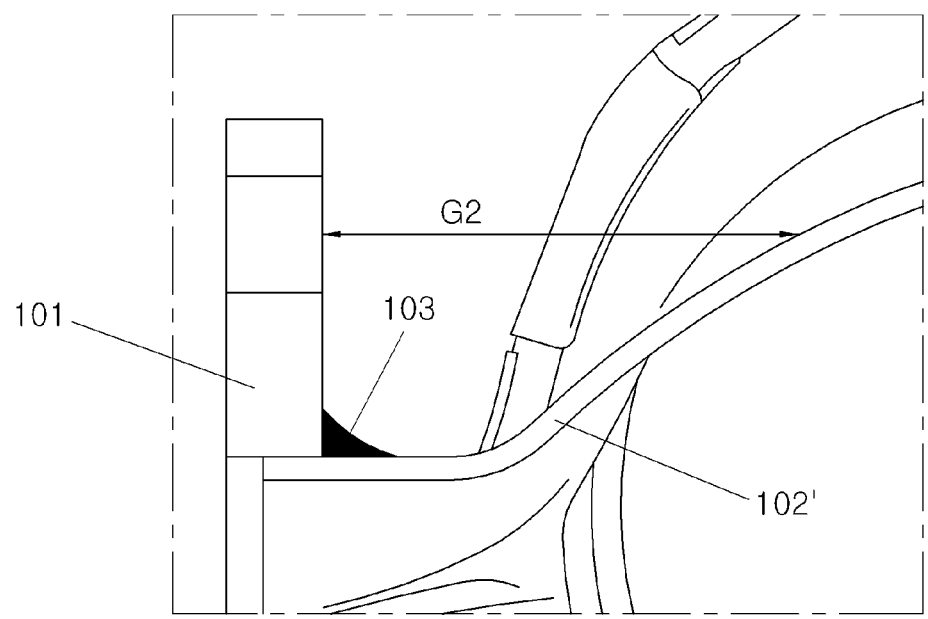
FIG. 4 is an enlarged view of portion B of FIG. 2.
Figure 5:
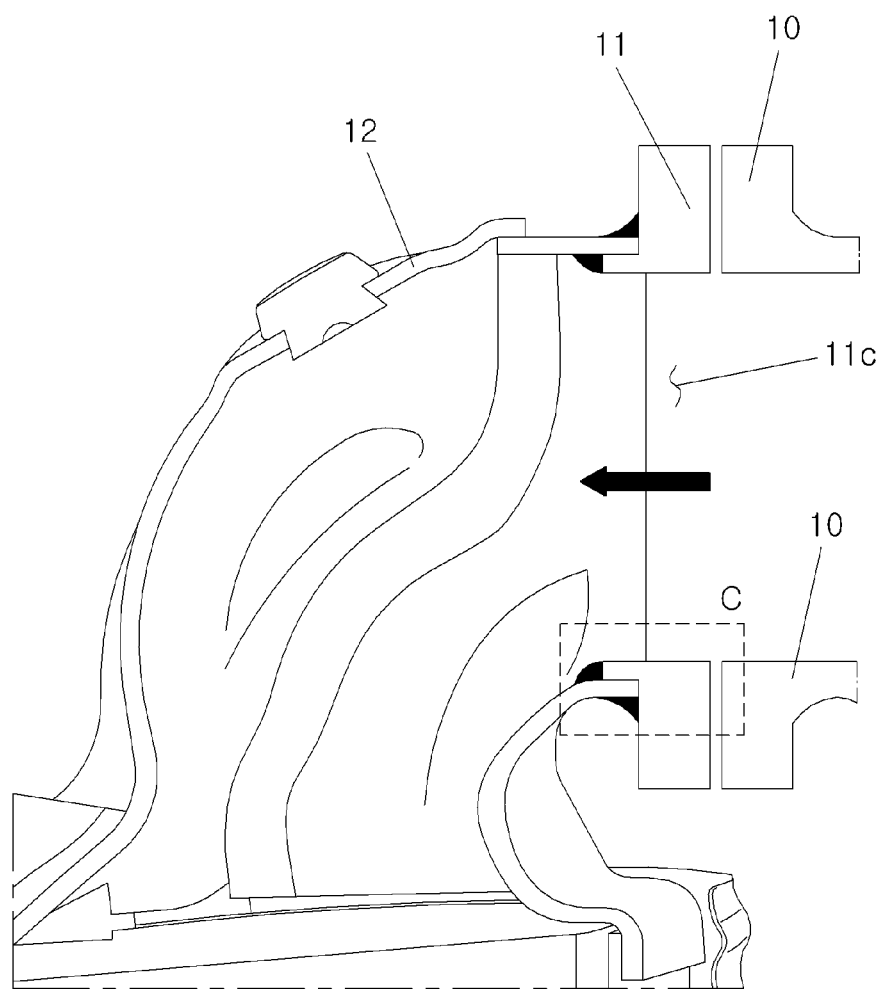
FIG. 5 is a cross-sectional view of a welding structure of an inlet portion of a WCC in which a flange of a turbine housing and a front cone of the WCC are welded to each other in accordance with an exemplary embodiment of the present inventive concept.
Figure 6:
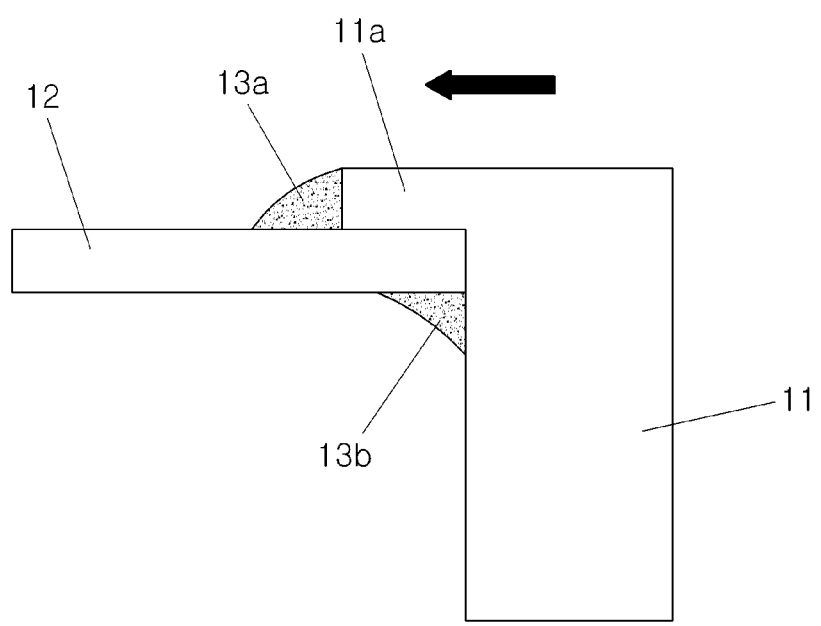
Figure 7:
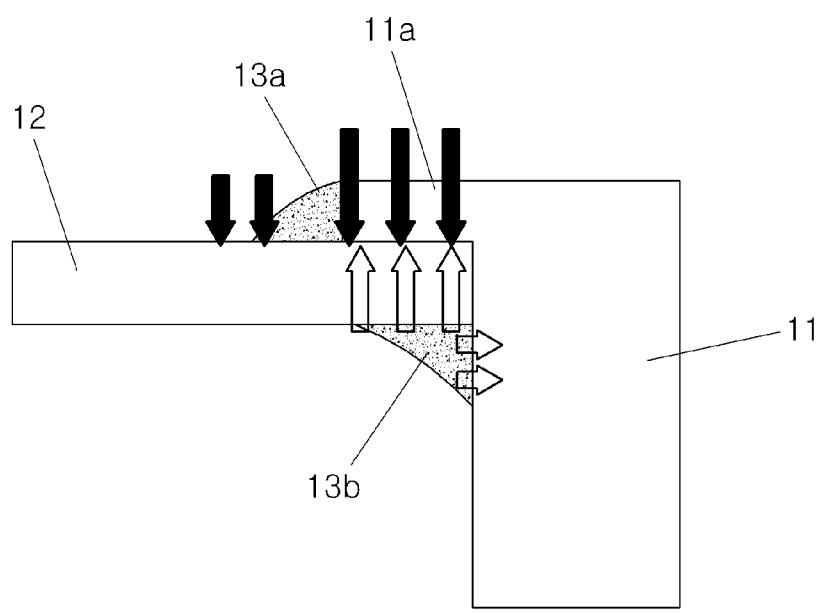

As illustrated in detail in FIGS. 5 to 7, in a welding structure of an inlet portion of a WCC of a vehicle in accordance with an exemplary embodiment of the present inventive concept, a flange 11 is mounted to a turbine housing 10 and connected to a front cone 12 of a WCC which reduces exhaust gas emitted from an engine. A through hole 11c is formed in the flange 11 to make the exhaust gas flow therethrough. An extending portion extends in a direction in which the exhaust gas flows at which the through hole 11c of the flange 11 is formed and surface-contacts the front cone 12 which is welded to the extending portion to connect the flange 11 to the front cone 12.

The through hole 11c is a passage formed in the flange 11 to emit the exhaust gas from the turbine housing side therethrough. An inner peripheral extending portion 11a extends in a direction in which the exhaust gas flows from the through hole 11c, that is, in a connection direction of the front cone 12. The inner peripheral extending portion 11a extends in a direction in which the exhaust gas flows from the through hole 11c of the flange 11, that is, to the front cone 12 by a predefined length, and contacts an inner peripheral surface of the front cone 12, that is, an inside circumference.

The front cone 12 is inserted into an outside of the inner peripheral extending portion 11a, and thus, the flange 11 and the front cone 12 overlap each other by the extending length of the inner peripheral extending portion 11a.

The flange 11 and the front cone 12 are fixed to each other by welding. That is, the inner peripheral extending portion 11a of the flange 11 and the inner peripheral surface of the front cone 12 are welded to each other. In this case, the inner peripheral surface of the front cone 12 is welded to an end of the inner peripheral extending portion 11a. Referring to FIGS. 6 and 7, the inner peripheral surface of the front cone 12 is welded to the inner peripheral extending portion 11 a at the end of the inner peripheral extending portion 11a to form an inner welding portion 13a.

A thickness of the inner peripheral extending portion 11a may be thinner than that of the flange 11.

An outer peripheral surface of the front cone 12 is directly welded to a main body of the flange 11 at an end thereof. The outer peripheral surface of the front cone 12 is welded to the main body of the flange 11 to form an outer welding portion 13b.

Here, a material of the front cone 12 may be stainless steel which is lighter and higher durability and workability than the commonly used cast steel material.

As described above, when the inner peripheral surface of the front cone 12 is welded to the end of the inner peripheral extending portion 11a which extends from the flange 11 to the inner peripheral surface of the front cone 12, as illustrated in FIG. 6, the inner welding portion 13a is formed at a lower portion of the front cone 12 in the flow direction of the exhaust gas, and therefore, exposure to a high-temperature exhaust gas can be minimized Further, the thickness of the inner peripheral extending portion 11a is thinner than that of the flange 11, and therefore, weldabiltiy is excellent and the durability of the welded portion is improved.

FIG. 7 illustrates a thermal stress distribution at the connection portion of the flange 11 and the front cone 12. There, the inner peripheral surface of the front cone 12 is applied with the thermal expansion stress from the inner peripheral extending portion 11a and the inner welding portion 13a and is applied with the thermal contraction stress from the outer welding portion 13b. The thermal expansion stress is dispersed at the inner peripheral surface of the front cone 12 as much as the extending length of the inner peripheral extending portion 11a, and therefore, durability against thermal fatigue increases.

Figure 8:
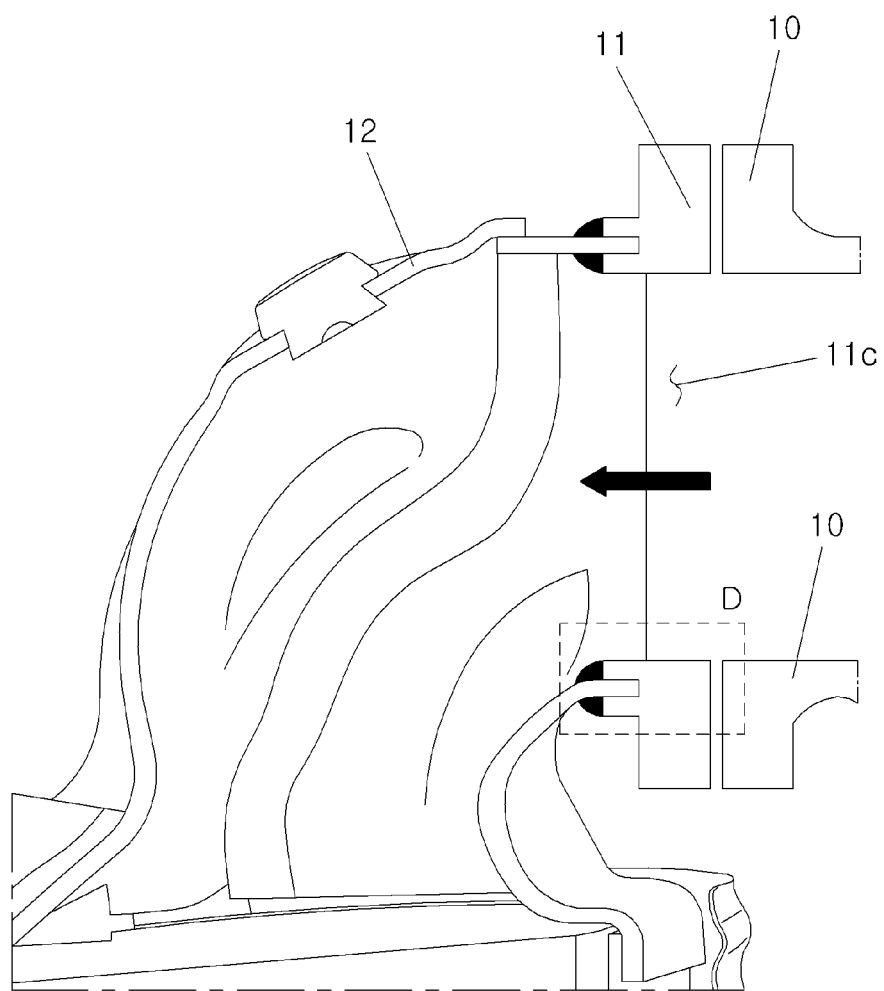
FIG. 8 is a cross-sectional view of a welding structure of an inlet portion of a WCC in which a flange of a turbine housing and a front cone of the WCC are welded to each other in accordance with another exemplary embodiment of the present inventive concept.
Figure 9:
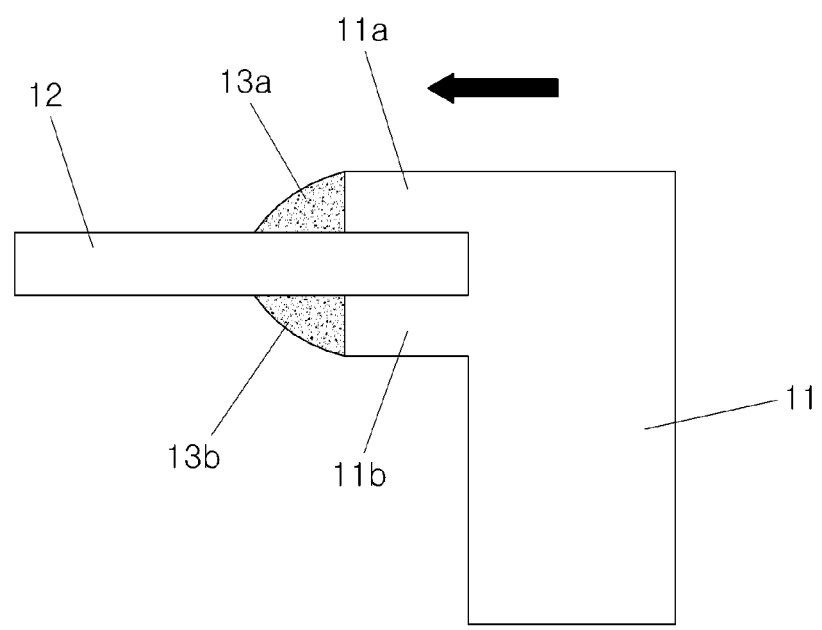
Figure 10:
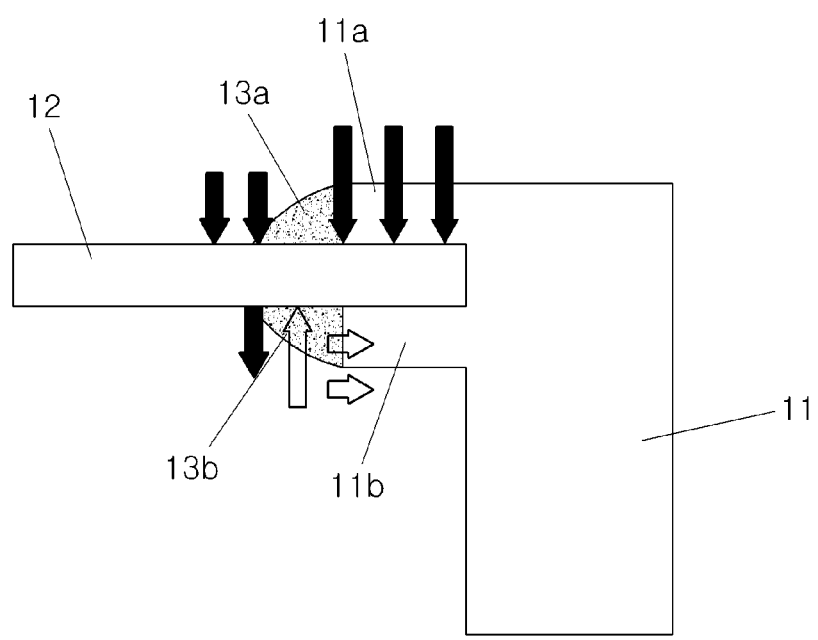

FIGS. 8 to 10 illustrate a welding structure of an inlet portion of a WCC of a vehicle in accordance with another exemplary embodiment of the present inventive concept.

In accordance with another exemplary embodiment of the present inventive concept, in addition to the components of the foregoing exemplary embodiment, an outer peripheral extending portion 11b, which extends from the flange 11 and contacts the outer peripheral surface of the front cone 12, is additionally formed.

The outer peripheral extending portion 11b is formed in a direction in which the exhaust gas flows from the flange 11, that is, the same direction as the inner peripheral extending portion 11a.

Likewise the inner peripheral extending portion 11a, the outer peripheral extending portion 11b has a thickness thinner than that of the flange 11.

The front cone 12 is inserted between the inner peripheral extending portion 11a and the outer peripheral extending portion 11b, and the front cone 12 is welded to the inner peripheral extending portion 11a and the outer peripheral extending portion 11b. That is, as illustrated in an inner peripheral surface and an outer peripheral surface of the front cone 12 are each welded to ends of the inner peripheral extending portion 11a and the outer peripheral extending portion 11b.

In accordance with another exemplary embodiment of the present inventive concept, the ends of the inner peripheral extending portion 11a and the outer peripheral extending portion 11b which extend from the flange 11 to the inner peripheral surface and the outer peripheral surface of the front cone 12 are each welded to the inner peripheral surface and the outer peripheral surface of the front cone 12. Therefore, the inner welding portion 13a and the outer welding portion 13b are formed at a downstream in the flow direction of the exhaust gas, thereby minimizing exposure to the exhaust gas. Further, the thickness of the outer peripheral extending portion 11b is thinner than that of the flange 11, and therefore, weldabiltiy is excellent and durability of the welded portion is improved.

FIG. 10 illustrates a thermal stress distribution at the connection portion of the flange 11 and the front cone 12. Here, the inner peripheral surface of the front cone 12 is applied with thermal expansion stress through the overall length of the inner peripheral extending part 11a and the inner welding part 13a, and the outer welding part 13b and the outer peripheral surface of the front cone 12 is applied with thermal contraction stress from the outer welding portion 13b, thereby increasing durability against thermal fatigue.

According to the welding structure of the inlet portion of the WCC in accordance with the exemplary embodiments of the present inventive concept as described above, it is possible to increase durability against thermal fatigue by delivering the thermal stress generated at the time of thermal expansion of the flange due to the flow of a high-temperature exhaust gas from the inner peripheral extending portion and the outer peripheral extending portion to the front cone, by welding the front cone to the inner peripheral extending portion and the outer peripheral extending portion in which the front cone of the WCC and the flange of the turbine housing surface-contact the peripheral extending portion and the outer peripheral extending portion which extend from the flange.

Further, it is possible to improve weldability of the welded portion by making the thickness of the inner peripheral extending portion and the outer peripheral extending portion thinner than that of the flange, thereby increasing durability of the welded portion.

In addition, it is possible to minimize exposure of the welded portion to the high-temperature exhaust gas when the high-temperature exhaust gas flows due to the inner peripheral extending portion formed at a lower portion of the inner peripheral extending portion.

The foregoing exemplary embodiments are only examples to allow a person having ordinary skill in the art to which the present invention pertains to easily practice the present disclosure. Accordingly, the present disclosure is not limited to the foregoing exemplary embodiments and the accompanying drawings, and therefore, a scope of the present disclosure is not limited to the foregoing exemplary embodiments. Accordingly, it will be apparent to those skilled in the art that substitutions, modifications, and variations can be made without departing from the spirit and scope of the disclosure as defined by the appended claims and can also belong to the scope of the present disclosure.

What is claimed is:

1. A welding structure for a warm-up catalytic converter (WCC) of a vehicle, the structure comprising:
   a flange of a turbine housing connected to a front cone of the WCC which reduces an exhaust gas emitted from an engine;
   a through hole formed in the flange, through which the exhaust gas flows; and
   an extending portion, which extends in a direction in which the exhaust gas flows from the through hole, formed at the flange and surface-contacting the front cone,
   wherein the front cone is welded to the extending portion to connect the flange to the front cone,
   wherein the extending portion includes an inner peripheral extending portion extending from the through hole and contacting an inner peripheral surface of the front cone,
   the inner peripheral extending portion is attached to the front cone, and
   wherein an end of an outer peripheral surface of the front cone is attached to the flange.

2. The welding structure of claim 1, wherein an end of the inner peripheral extending portion is welded to the inner peripheral surface of the front cone.

3. The welding structure of claim 1, wherein a thickness of the inner peripheral extending part is thinner than that of the flange.

4. The welding structure of claim 1, wherein the extending portion further includes an outer peripheral extending portion extending from the through hole and contacting an outer peripheral surface of the front cone, and
   the outer peripheral extending portion is welded to the front cone.

5. The welding structure of claim 4, wherein an end of the outer peripheral extending portion is welded to the outer peripheral surface of the front cone.

6. The welding structure of claim 4, wherein a thickness of the outer peripheral extending part is thinner than that of the flange.

7. The welding structure of claim 1, wherein the front cone is formed of a stainless steel material.

\* \* \* \* \*